3,671,385
FIBROUS CARBONACEOUS COMPOSITES AND METHOD FOR MANUFACTURING SAME

Paul E. Trent, Andersonville, and James E. Miner, Oak Ridge, Tenn., assignors to the United States of America as represented by the United States Atomic Energy Commission
No Drawing. Filed July 17, 1970, Ser. No. 55,953
Int. Cl. D21h 5/18
U.S. Cl. 162—152          10 Claims

ABSTRACT OF THE DISCLOSURE

Carbonaceous composites are prepared by spraying an aqueous slurry containing discrete graphite fibers, a carbonizable resin in particulate form, and a water-soluble starch onto a porous mandrel coupled to a vacuum source for drawing off excess water from the formed structure. This structure is then heated to a temperature sufficient to carbonize the starch and the resin for providing binders which join together the fibers.

---

The present invention relates generally to carbonaceous fiber composites and more particularly to an improved method for manufacturing such composites. This invention was made in the course of, or under, a contract with the U.S. Atomic Energy Commission.

Fiber-reinforced carbon and graphite composites have a high strength-to-weight ratio, high-temperature-strength retention, a melting point at extremely high temperatures, and are chemically inert. Because of such properties the composites are particularly useful in space and other high-temperature applications. Fiber-reinforced carbon or graphite composites have been manufactured by spraying carbonaceous fibers mixed with a diluted resin onto a mandrel until a desired thickness was attained. After evaporating the diluent for the resin (generally benzene, methylisobutyl ketone, methylethyl ketone, or some other relatively volatile solvent) from the sprayed composite, the resin binder was carbonized at a temperature of about 1000° C. and subsequently converted to graphite at about 3000° C., if such conversions were desired. The carbonized composites were then densified by employing conventional vacuum or pressure impregnating and carbonizing techniques. While the method of making the composites proved to be one of the more successful techniques of forming such composites, some problems and shortcomings were encountered. For example, it was very difficult to obtain a uniform as-sprayed fiber structure, to impregnate homogeneously, to densify to maximum density, and to thermally process the composite without causing gross cracking or delaminating. Obtaining uniform as-sprayed fiber structures by employing established methods of hand-spraying the fibrous mixture onto a stationary or rotating mandrel has proved to be extremely difficult, with spraying times up to and occasionally exceeding 24 hours being required for even relatively small composites. During such extended periods of spraying, deleterious variations in substrate uniformity can be caused by stoppage of spray guns, operator variations, and spray-mix variations. Also, if the spraying stops for any reason, the sprayed solvent rapidly evaporates so as to cause surface drying, which results in an interlaminar fault within the composite. This can result in a fibrous composite with density variations which result in failure during the densifying process.

The evaporation of the diluent during the drying step changes the concentration ratio of the sprayed resin in the composite, resulting in non-uniformity of the carbonized composite. Toxic and highly flammable vapors were produced during the spraying and drying steps due to the volatilization of the diluent. The detection and disposal of these toxic and flammable vapors required considerable effort.

Composites produced by the above method possessed thermal expansion anisotropic ratios ranging from 1.75 to 2.00, with the most expansion occurring in the plane parallel to the spraying direction, i.e., through the thickness of the composite. With thermal expansion varying greatly in two directions, excessive cracking of the composite will invariably occur during the densification of the composite. Normally, with composites in the shape of tubulations or cylinders it has been difficult to achieve full density (about 1.7 to 1.8 g./cc.) with an inside diameter-to-outside diameter ratio of less than 0.75, thus inhibiting full densification of relatively thin-walled composites.

It is the primary objective or aim of the present invention to overcome or substantially minimize the above and other shortcomings and problems by providing improved fiber-reinforced carbon or graphite composites and the method of making the same. This objective is achieved by fabricating the composites from a sprayable mixture of carbonaceous fibers, water, and a water-soluble starch. A carbonizable resin in particulate form is preferably incorporated in the mixture to aid the starch in binding together the fibers. Also, a filler material such as carbon black may be added to the mixture. The starch provides the primary binder for the sprayed substrate during the spraying operation and continues to provide strength during the carbonization step, with the fibers being wetted by the resin prior to the carbonization thereof. Both the starch and the resin are converted to carbon during the carbonization cycle. The elimination of the organic diluent considerably reduces or obviates the aforementioned problems and also significantly facilitates the spraying operation in that the time required for spraying is reduced by a factor of 30 or more to where less than one hour is required to complete a spraying operation previously requiring at least 24 hours.

Other and further objects of the invention will be obvious upon an understanding of the illustrative method about to be described, or will be indicated in the appended claims, and various advantages not referred to herein will occur to one skilled in the art upon employment of the invention in practice.

Described generally, the present invention comprises the fabrication of an improved discontinuous fibrous carbonaceous composite. The improved composite is characterized by uniform density, random fiber orientation, relatively low shrinkage during carbonizing, and substantially uniform thermal expansion. The method comprises the steps of preparing a mixture of chopped, uniform-length, carbonaceous fibers; water; a water-soluble, carbonizable starch; and a carbonizable resin binder in particulate form; spraying the resulting aqueous mixture onto a porous mandrel subjected to vacuum for effecting the removal of excess water from the sprayed substrate; gelatinizing the starch by drying the composite at an elevated temperature; and thereafter heating the composite to a temperature sufficient to carbonize the resin and starch in the composite. Upon completing the formation of the composite, which may have a bulk density in the range of about .15 to .50 g./cc., the composite may be subjected to a series of conventional impregnation-and-carbonization cycles for increasing the density of the composite up to about 1.7 to 1.8 g./cc.

The fibrous graphite composites produced by practicing the method of the present invention possess thermal expansion anistotropic ratios, i.e., the ratio of the coefficient of thermal expansion of the composite's thickness to its length, ranging from 1.04 to 1.58, with the latter being an especially high ratio for this process since the average ratio is about 1.25. With these low anisotropic ratios, expansion and shinkage during the carbonization cycles tend to be more uniform in the various directions, thereby facilitating virtually full densification of thick-walled tubulations and other configurations. For example, two thick-walled cylinders having heretofore very unfavorable inside diameter-to-outside diameter ratios of 0.53 to 0.59 were fabricated and processed to densities of 1.55 g./cc. in four impregnation-carbonization cycles without delaminating or cracking. Previously, fibrous graphite composites with such unfavorable inner diameter-to-outer diameter ratios could not be processed past about 0.5 g./cc. without cracking or delaminating during carbonization.

The fibers employed in the composite are carbon or graphite fibers in a size range of about 1 to 10 microns in diameter and about 6 to 15 mils in length. The fibers in each mixture are preferably straight and of uniform length to assure random dispersion of the fibers in the composite.

The binder is primarily provided by a water-soluble starch such as afforded by any of the naturally occurring plant starches, e.g., cereals, corn, potato, tapioca, etc. The starch may be employed in the mixture in a starch-to-fiber ratio of about 15 to 50 p.p.h. by weight (15 to 25 p.p.h. being preferred), with the starch being in a particulate form of about 20 to 50 microns in diameter. Upon spraying the mixture, the starch is uniformly dispersed throughout the composite and remains so as the water is drawn off by vacuum or otherwise removed from the slurry. The starch particles are then gelatinized at a temperature of about 80° to 100° C. to hold the fibers or solid particles in place. Further fiber-binding action prior to carbonization may be provided by thermosetting the gelatinized starch at a higher temperature of about 130° to 170° C. With the fibrous structure held in position by the gelatinized starch, the composite may be heated to a temperature adequate to convert the starch to a carbonaceous state. Normally, a temperature in the range of about 750° to 1000° C. is adequate to provide the desired carbonization of the starch.

The secondary binder, i.e, the resin binder, employed in the composite may be a thermoplastic resin such as coal tar or petroleum pitch or a thermosetting resin such as phenolic, epoxy, furfuryl alcohol, and combinations of thermoplastic and/or thermosetting resins. Preferably, the resins selected for use in the fibrous composite are those which provide tenacious bonds with individual fibers and between adjacent fibers as well as possessing a high percentage of carbon or graphite when subjected to the necessary carbonization temperatures. The resin binder is in a particulate form in a size range of about 100 to 200 mesh (Tyler) and in a quantity adequate to provide a resin-to-fiber ratio in the range of about 25 to 50 p.p.h. The resin aids the starch in holding the fibers together to form the fibrous composite. The temperatures required for the carbonization of the resins are within the temperature range utilized for carbonizing the starch.

In addition to the resin, a filler material such as carbon black or pre-carbonized or -graphitized resins in particulate or powder form of about 0.7 to 1 micron may be employed in a mixture in a filler-to-fiber ratio of about 25 to 50 p.p.h. It is believed that solid particles such as provided by the resin binder and the filler in the spraying mix disrupt the spray pattern and cause a more random fiber distribution which provides a more desirable composite.

Water is employed as the diluent for the sprayable mixture. Sufficient water is employed to provide a slurry-like mixture which allows the latter to be formed into the desired configuration by any suitable technique such as spraying, pulp molding, and the like. Air-spraying is the preferred technique of forming the composite since the fiber distribution and anisotropy ratios are more satisfactory.

The aqueous mixture is preferably air-sprayed onto a porous mandrel which may be of any desired shape capable of providing cylinders, cones, flat plates, hexagonal shapes, or almost any other geometric shape. The mandrel is coupled to a vacuum source which is capable of providing a vacuum up to about 26 inches of mercury at the mandrel surface contacted by the mixture. With this vacuum being applied through the pores in the mandrel, the substrate or composite is held against the mandrel during the spraying while excess water is drawn from the composite through the pores in the mandrel. The excess water removed is that which is greater than the amount needed to gelatinize the starch and which is readily removable.

The spraying operation may be accomplished by employing any suitable fixed or hand-held air-spraying mechanism. Also, the mandrel may be fixed, movable in a selected pattern, or rotatable about one or more axes.

In order to provide a clearer understanding of the method of the present invention, a typical example of spray-forming and carbonizing a composite is set forth below.

EXAMPLE

A fibrous graphite composite having a cylindrical configuration with a diameter of 4.9 inches, a length of 10.0 inches, and a wall thickness of 1.0 inch was fabricated as follows: A slurry of graphite fibers, water, pitch, and a water-soluble starch was prepared for spraying onto a porous mandrel. The slurry contained 800 grams of chopped graphite fibers, 2 microns in diameter and 250 microns long; 400 grams of 100-mesh coal tar pitch particles; and 150 grams of potato starch binder in 3 gallons of water. The slurry was air-sprayed onto a rotating porous mandrel at a pressure of 10–20 p.s.i., with the mandrel being evacuated from within and maintained at an absolute pressure of approximately 26 inches of mercury. The mandrel was sprayed until a thickness of 1.0 inch was obtained. The sprayed composite was removed from the mandrel assembly and the starch gelatinized for 8 hours at 90° C. and thermoset at 150° C. for 8 hours. The composite was then carbonized at 1000° C., impregnated with pitch, carbonized, and, after four impregnation-carbonization cycles, graphitized at 3000° C. in an inert atmosphere. Analytical data indicated the composite to be a homogeneous structure having a density of 1.50 gm./cc. and an anisotropy ratio of 1.04.

Tables I and II set forth below relate to fibrous graphite cylinders prepared by employing the method of the present invention. The graphite fibers used in these cylinders are of uniform 10-mil length and 2 microns in diameter with the densities of the cylinders being as carbonized but prior to any impregnation steps. In Sample No. C, only sufficient water was used to provide a relatively thick but sprayable slurry. The viscosity of this slurry is believed to be the reason for the relatively high anisotropy ratio set forth in Table II.

TABLE I

Fibrous-Graphite Composite Cylinders

| Sample No. | Measured density (g./cc.) | Primary binder content* (p.p.h.) | Filler or secondary binder content* (p.p.h.) | Diluent |
|---|---|---|---|---|
| A | 0.18 | 50S | | Water. |
| B | 0.19 | 50S | | Do. |
| C | 0.21 | 50S | | Do. |
| D | 0.19 | 50S | | Do. |
| E | 0.19 | 25S | | Do. |
| F | 0.19 | 25S | 25E | Do. |
| G | 0.20 | 25S | 25P | Do. |
| H | 0.36 | 25S | 37.5C | Do. |
| I | 0.43 | 25S | 50C | Do. |
| J | 0.38 | 15S | 50P | Do. |
| K | 0.29 | 15S | 25C, 50P | Do. |

*Binder content is parts of binder per 100 parts of fiber by weight; S=potato starch; E=epoxy powder; P=coal tar pitch particles, −100 mesh; C=carbon black graphitized to 3,000° C.

TABLE II

Coefficients of Thermal Expansion

| Sample No. | CTE ($\times 10^{-6}$ °C.$^{-1}$) at 1,000° C. | | |
|---|---|---|---|
| | Circumferential direction | Radial direction | Anisotropy ratio |
| B | 2.4 | 2.8 | 1.17 |
| C | 1.7 | 2.7 | 1.58 |
| D | 2.3 | 3.0 | 1.30 |
| E | 2.7 | 3.1 | 1.15 |
| F | 2.6 | 2.7 | 1.04 |
| G | 2.7 | 2.9 | 1.07 |

It will be seen that the method of the present invention provides a highly efficient procedure for preparing fibrous composites which lend themselves to densification by impregnation-and-carbonization cycles.

What is claimed is:

1. A method of manufacturing a carbonaceous fibrous composite of a density in the range of about 0.15 to 0.50 g./cc. comprising the steps of forming into a desired configuration an aqueous slurry comprising randomly oriented carbonaceous fibers, a carbonizable resin in particulate form, and a water-soluble starch in particulate form, removing water from the formed structure, gelatinizing the starch particulates, and thereafter heating the formed structure to a temperature adequate to carbonize the starch and resin for binding together the fibers.

2. The method of manufacturing a carbonaceous composite as claimed in claim 1, wherein the step of forming the aqueous slurry into a desired configuration comprises spraying the slurry onto a porous mandrel, and wherein the step of removing water from the slurry comprises subjecting said mandrel to a vacuum adequate for drawing water from the formed structure through pores in said mandrel.

3. The method of manufacturing a carbonaceous composite as claimed in claim 1, wherein the starch in the slurry is a naturally occurring plant starch in a starch-to-fiber ratio of 15 to 50 p.p.h., and wherein the starch particulates are in a size range of about 20–50 microns in diameter.

4. The method of manufacturing a carbonaceous composite as claimed in claim 1, wherein said fibers are carbon or graphite fibers of essentitally uniform length and selected from a size range of 1 to 10 microns in diameter and 6 to 15 mils in length.

5. The method of manufacturing a carbonaceous fibrous composite as claimed in claim 1, including the additional step of increasing the density of the composite up to about 1.8 g./cc. by successively impregnating the composite subsequent to the carbonizing step with pitch and heating the impregnated composite to a temperature sufficient to carbonize the pitch.

6. The method of manufacturing a carbonaceous composite as claimed in claim 1, wherein the resin particulates are in a size range of 100 to 200 mesh and in said slurry in a resin-to-fiber ratio of 25 to 50 p.p.h.

7. The method of manufacturing a carbonaceous composite as claimed in claim 6, wherein the carbonizable resin is selected from the group consisting of pitch and epoxy.

8. The method of manufacturing a carbonaceous fibrous composite as claimed in claim 6, wherein carbon or graphite particles in a size range of 0.70 to 1.0 micron are incorporated in the slurry for providing a filler in the composite, and wherein the carbon or graphite particles are in said slurry in a particle-to-to-fiber ratio of about 25 to 50 p.p.h.

9. A fibrous carbonaceous article comprising randomly oriented carbon fibers bound together by a carbonized binder with the latter being provided prior to the carbonization thereof by a carbonizable resin in particulate form, and a water-soluble starch, said article having a density in the range of about 0.15 to 0.50 g./cc. and a thermal anistropy ratio in the range of about 1.04 to about 1.58.

10. The article of claim 9, wherein the fibers are graphite of about 2 microns in diameter and about 250 microns in length, wherein the resin is coal tar pitch, and wherein the starch is a naturally occurring plant starch.

References Cited

UNITED STATES PATENTS

| 3,367,812 | 2/1968 | Watts | 156—155 |
| 3,407,038 | 10/1968 | Beasley | 23—209.1 F X |
| 3,265,557 | 8/1966 | DeFries et al. | 162—138 |
| 3,269,889 | 8/1966 | Hutchins | 162—138 X |
| 3,077,439 | 2/1963 | Shea et al. | 264—29 |

S. LEON BASHORE, Primary Examiner

F. FREI, Assistant Examiner

U.S. Cl. X.R.

23—209.1, 209.2; 156—155; 162—157 R, 157 C, 164, 171, 175